United States Patent [19]

Jacoby

[11] 4,124,805
[45] Nov. 7, 1978

[54] POLLUTION-FREE POWER GENERATING AND PEAK POWER LOAD SHAVING SYSTEM

[75] Inventor: Charles H. Jacoby, Dalton, Pa.

[73] Assignee: International Salt Company, Clarks Summit, Pa.

[21] Appl. No.: 552,376

[22] Filed: Feb. 24, 1975

Related U.S. Application Data

[63] Continuation of Ser. No. 188,856, Oct. 13, 1971, abandoned.

[51] Int. Cl.² .............................................. H02P 9/04
[52] U.S. Cl. ..................................... 290/1 R; 60/641; 290/52
[58] Field of Search ..................... 290/52, 43, 54, 1 R, 290/2; 60/398, 641; 166/305 D; 61/0.5

[56] References Cited

U.S. PATENT DOCUMENTS

| | | | |
|---|---|---|---|
| 3,523,192 | 8/1970 | Lang | 290/52 |
| 3,538,340 | 11/1970 | Lang | 290/52 |
| 3,858,397 | 1/1975 | Jacoby | 60/641 |
| 3,864,917 | 2/1975 | Jacoby | 60/641 |

Primary Examiner—Gerald P. Tolin

[57] ABSTRACT

An improved electric power regeneration system, featuring reduced environmental air and thermal pollution. The system employs a method and means whereby during periods of low load demands upon a conventional type electric power generating plant, the excess power then available is employed (at low cost to the system) to pump low temperature ambient air (or any other suitably heat-absorbent gas) at relatively low pressure into a subterranean cavity in a salt deposit which is in thermal communication via an interconnecting spire or dome of salt with a geological "mother bed" occurring at such depths below the earth's surface as to constitute a constant high heat source. The air/gas conduit system is intermittently closed, whereupon the heat intake from the earth's center causes significant storage of heat energy in the entrapped air/gas and substantial increases of the pressures under which it is entrapped. When load requirements upon the generating plant are high, the meantime developed high pressure/temperature air/gas supply within the subterranean cavity is released to operate any suitably responsive turbine, or other engine driving electrical generating equipment so as to contribute to supply of the higher power demand.

6 Claims, 3 Drawing Figures

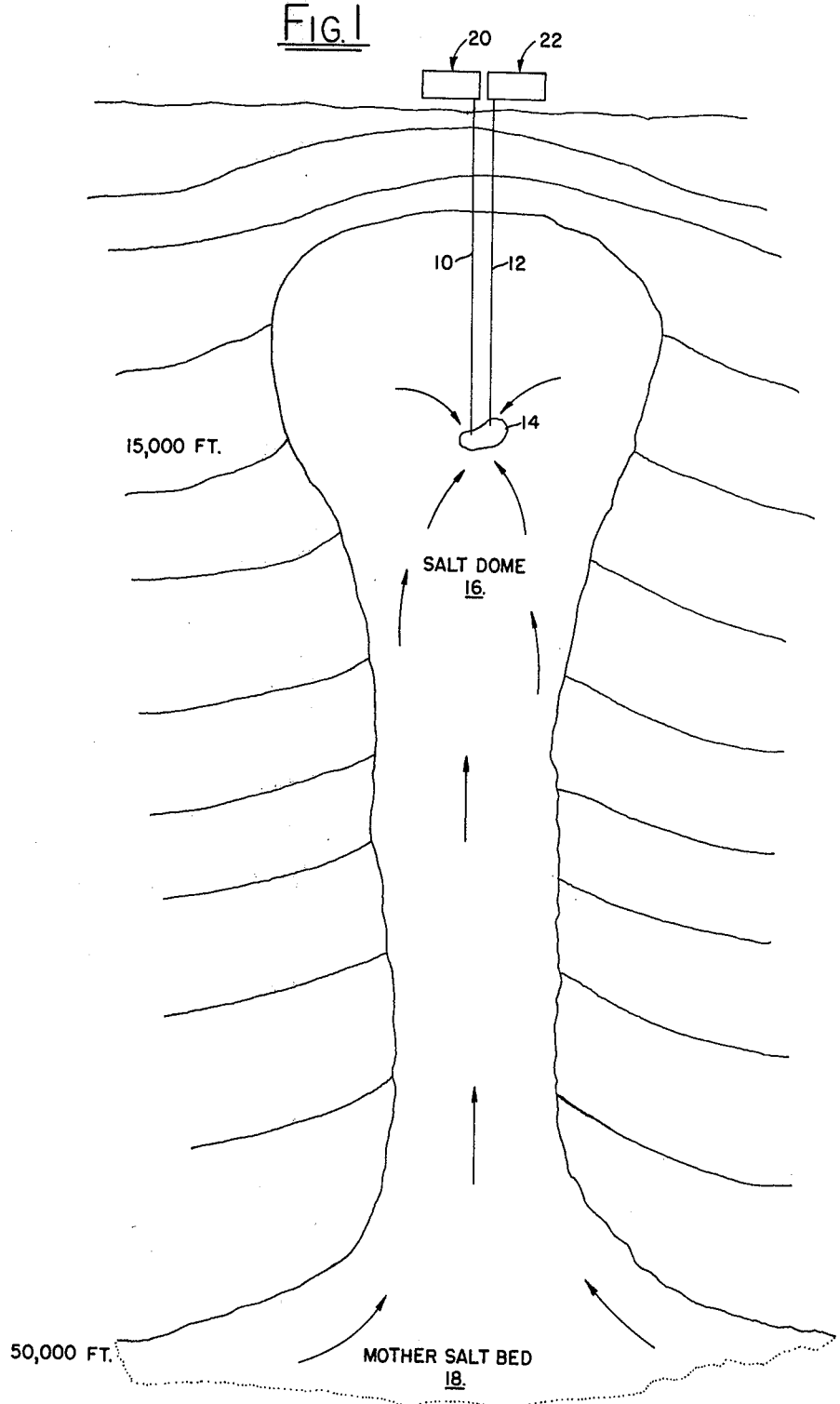

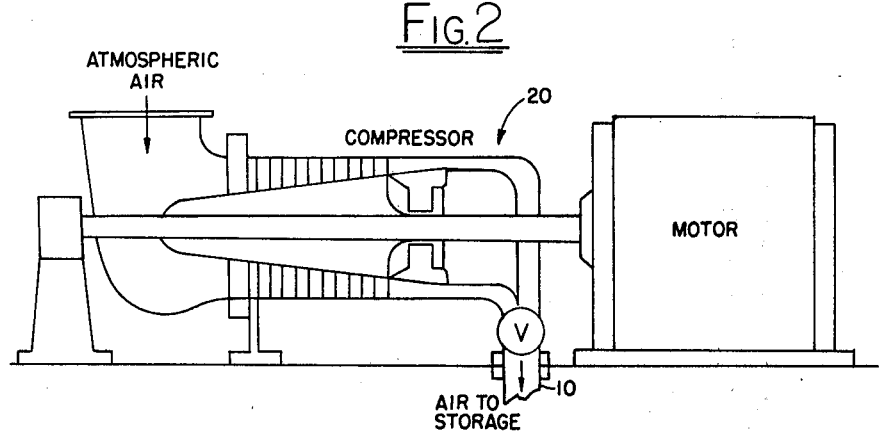
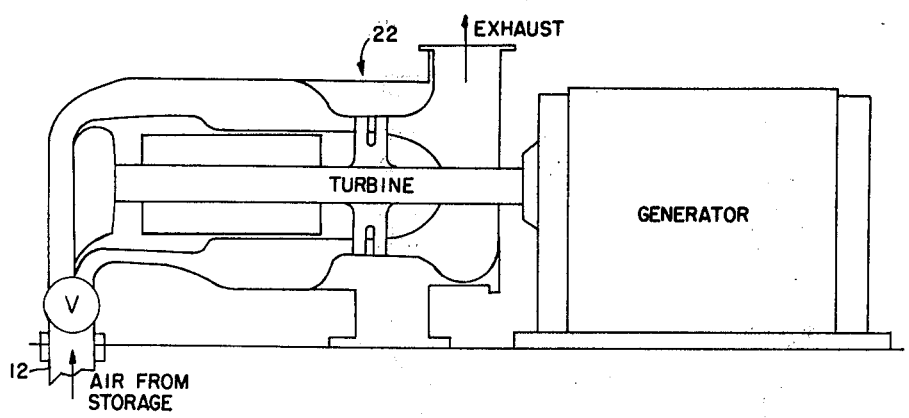

POLLUTION-FREE POWER GENERATING AND PEAK POWER LOAD SHAVING SYSTEM

This is a continuation of application Ser. No. 188,856 filed Oct. 13, 1971, now abandoned.

BACKGROUND OF THE INVENTION

Air-gas-liquid storage arrangements underground as a means to store energy for subsequent power generation purposes have been previously suggested. Such systems call upon excess electrical capacity during periods of low load requirements to inject a fluid under high pressure into subterranean cavities and then during high load demand periods to subsequently release the compressed fluid to drive electricity generating equipment. However, such systems typically employ cavities which are relatively close to the earth's surface wherein the cavity walls are cool. Hence, such prior systems have of necessity involved high input compression operating costs; while at the same time being attended by high heat losses to the geology ambient to the storage cavity. Such losses require expensive heat replacement inputs, in order to maintain such systems operative as intended. An example of such a previously suggested system is disclosed in U.S. Pat. No. 3,538,340.

It is the object of the present invention to provide an improved pollution-free energy storage system whereby certain disadvantages of previously suggested hydro-air-storage operated systems are obviated; whereby substantial operating economies are effected.

A DESCRIPTION OF THE PRESENT INVENTION

The invention is illustrated by way of example in the accompanying drawing wherein:

THE DRAWING

FIG. 1 is a vertical geological sectional view illustrating installation of a typical system of the invention;

FIG. 2 is a schematic illustration of a suitable air input pumping facility, in accordance with the invention; and FIG. 3 is a schematic illustration of a suitable heated and compressed reserved air utilizing electric power generating facility.

DETAILED DESCRIPTION OF EXAMPLES OF THE INVENTION

It is known that the interior of the earth is extremely hot, and in accordance with the present invention this "geothermal heat" is utilized by being extracted from an otherwise inaccessible source by a method which comprises; first locating a particular type of mineral formation, and then establishing at an accessible depth within said formation a heat-absorbing cavern.

A suitable subterranean mineral formation for the purpose of the invention is one of high heat conductivity which extends upwardly toward the earth's surface to a level which is accessible by commercially practicable bore hole drilling techniques, while at the same time being in thermal continuity with a deep-seated heat source which is at such depth as to be totally inaccessible by such techniques. The heat cavern which is thus established is at such depth as to assure that the heat energy flowing from its lower source will be constantly at sufficient temperature and in efficient thermal communication therewith so that the heat extracted from the heat well will be continually replenished so as to make the facility economically feasible.

A preferred form of mineral formation for this purpose comprises any highly heat-conductive mineral dome or spire; such as a rock salt dome, the sodium chloride crystals of which are not only highly heat-conductive by nature, but are also soluble in water and/or other readily available solvents. Thus, as shown in the drawing herewith at FIGS. 1–3, one or more well bores as indicated at 10–12 may be drilled to extend from the earth's surface downwardly to the desired level into the salt spire, whereupon there may be established therein by solution mining techniques a cavity 14. The salt "dome" as illustrated at 16 is geologically integrated in thermal continuity with a relatively deep-seated earth-center-related "mother bed" geological formation 18 which may comprise a salt bed or some other suitable earth-heat conducting structure.

As shown herein, the upper end of the bore hole 10 at the earth's surface may be connected to the discharge of a compressor unit as illustrated generally at 20 (FIG. 2), while the upper end of the other bore hole 12 is connected to the intake end of a turbine driven electricity generating unit 22, as better shown at FIG. 3. Thus, during periods of low power demands upon the associated electrical generating facility, relatively cool ambient air, or other gas under low pressure is pumped into the heat absorbing cavern, and thus into heat exchange relation with the wall surfaces thereof. The thereby heated and consequently increased pressured air supply is subsequently released from the heat cavern into operative community with the power generating facility at the earth's surface, where its pressure/heat energy may be utilized in any preferred manner. Any suitable valving arrangement as suggested at FIGS. 2–3 may be employed to control the system.

The salt domes occurring below the earth's surface for example in Louisiana, Texas and Mississippi provide ideal conditions for practice of the present invention, not only because of their thermal continuities with deep-seated heat sources as explained hereinabove, but also because such rock salt in situ is plastically compressed into air-tight condition due to the tremendous techtonic pressure forces which gave rise to their creation. Thus, a heat cavern as illustrated and described hereinabove when provided in an environment of this type will be totally competent to retain in pressure sealing relation the air/gas supply which is to be periodically pumped into the cavern for heat absorption/expansion purposes. Previously suggested arrangements for temporary storage of compressed air for power generation purposes in abandoned mines, salt bed cavities, or the like at relatively shallow depths under the earth's surface are beset with drastic pressure loss problems due to the relatively low ambient temperatures of the host rock and the high heat conductivity characteristics of rock salt.

A particular advantage attendant the provision of the heat exchange cavern in a salt dome in accordance with the present invention, derives from the remarkable heat transfer characteristics of rock salt; the heat transfer co-efficient of rock salt being generally rated as 4.11 BTU's/sq.ft./degree F/ hour. Thus, by virtue of such an installation the conduction of heat through the dome from the remotely situated inaccessible deep source to the heat exchange cavern occurs at such rate as to promptly replenish heat withdrawals from the cavern walls, thereby providing an improved and commercially feasible facility for the intended purposes.

I claim:

1. The method not only of augmenting but also increasing the power output of an electrical power generating system, which comprises the steps of:
   (a) forming an underground cavity in a salt dome at such a depth that the walls of the cavity are substantially continuously at a selected elevated temperature;
   (b) generating electrical power at a surface facility;
   (c) diverting a selected amount of the power generated in step (b), during a low demand period and in advance of anticipated peak demand period, by pumping a compressible gas into initially low pressure and low temperature storage within said underground cavity;
   (d) closing off said cavity at a selected time sufficiently in advance of said anticipated peak demand period to allow the temperature of the gas stored in step (c) substantially to attain said selected elevated temperature and
   (e) augmenting power generated in step (b) and increasing the total output of said surface facility by opening said cavity during the peak demand period and releasing said gas to drive auxiliary power generating equipment by recovery not only of said selected amount of power diverted in step (c) but also of the heat energy supplied by said cavity.

2. A method as set forth in claim 1 wherein said gas is air.

3. A method as set forth in claim 2 wherein said salt deposit essentially comprises sodium chloride.

4. The method of recovering geothermal energy to augment the power output of an electrical power generating system, which comprises the steps of:
   (a) locating an underground mineral formation which is of high heat conductivity and which extends upwardly towards the earth's surface at least to a level which is accessible by commercially practicable bore hole drilling techniques, while at the same time being in thermal continuity, with a deep-seated heat source which is at such depth as to be totally inaccessible by such techniques;
   (b) forming a cavern in said mineral formation by said commercially practicable bore hole drilling techniques at such a great depth below the earth's surface that the mineral formation around said cavern is at an elevated temperature and is plastically compressed into air-tight condition;
   (c) generating electrical power at the earth's surface and periodically diverting some of the generated power to pump relatively cool, ambient air at the earth's surface into said cavern under low pressure;
   (d) sealing off said cavern for a time sufficient to allow the air trapped in said cavern to attain a pressure higher than said low pressure due to heating of the air within said cavern; and
   (e) periodically tapping the heated air within said cavern and generating additional electrical power therefrom.

5. The method as defined in claim 4 wherein said mineral formation is a sodium chloride dome.

6. The method as defined in claim 5 wherein the heated air tapped in step (e) is returned to the earth's surface to generate said additional power.

* * * * *